(12) United States Patent
Zygmanowski et al.

(10) Patent No.: US 12,098,092 B2
(45) Date of Patent: *Sep. 24, 2024

(54) GLASS REPAIR DEVICE AND REPAIR METHOD

(71) Applicant: PMA/TOOLS AG, Willich (DE)

(72) Inventors: Alexander Zygmanowski, Unna (DE); Christopher Bergen, Bad Laasphe (DE)

(73) Assignee: PMA/TOOLS AG, Willich (DE)

(*) Notice: Subject to any disclaimer, the term of this patent is extended or adjusted under 35 U.S.C. 154(b) by 0 days.

This patent is subject to a terminal disclaimer.

(21) Appl. No.: 17/844,773

(22) Filed: Jun. 21, 2022

(65) Prior Publication Data

US 2022/0402813 A1 Dec. 22, 2022

(30) Foreign Application Priority Data

Jun. 22, 2021 (DE) ...................... 10 2021 116 166.5

(51) Int. Cl.
C03C 17/00 (2006.01)
(52) U.S. Cl.
CPC ........ C03C 17/002 (2013.01); *C03C 2218/32* (2013.01)
(58) Field of Classification Search
None
See application file for complete search history.

(56) References Cited

U.S. PATENT DOCUMENTS

| 3,562,366 | A | | 2/1971 | Sohl |
| 4,681,520 | A | * | 7/1987 | Birkhauser, III .......... B60J 1/02 425/13 |
| 4,744,841 | A | | 5/1988 | Thomas |
| 4,826,413 | A | | 5/1989 | Matles |
| 5,101,599 | A | * | 4/1992 | Takabayasi ........... B06B 1/0261 451/910 |
| 5,156,853 | A | | 10/1992 | Werner et al. |
| 5,565,217 | A | * | 10/1996 | Beckert ............. B32B 17/10963 425/13 |
| 5,591,460 | A | * | 1/1997 | Wanstrath ......... B32B 17/10963 425/13 |
| 5,670,180 | A | | 9/1997 | Mackey et al. |
| 5,792,480 | A | | 8/1998 | Thomas |
| 5,837,294 | A | | 11/1998 | Shrimpton |

(Continued)

FOREIGN PATENT DOCUMENTS

| CN | 1419492 A | 5/2003 |
| CN | 102503179 A | 6/2012 |

(Continued)

*Primary Examiner* — Alexander M Weddle
(74) *Attorney, Agent, or Firm* — LEYDIG, VOIT & MAYER, LTD.

(57) ABSTRACT

A device for repairing a damaged spot in a repair area of a glass pane includes an attachment portion, a repair portion and a first sensor device. The attachment portion is configured to be releasably attached to a main surface of the glass pane. The repair portion is configured to repair the glass pane. The first sensor device is configured to be brought into data connection with a control device and to determine a contact pressure with which an injector unit, which is configured to be disposed on the repair portion, is pressed onto the repair area in order to release a repair agent.

28 Claims, 5 Drawing Sheets

(56) References Cited

U.S. PATENT DOCUMENTS

| | | |
|---|---|---|
| 6,302,670 B1 | 10/2001 | Thomas et al. |
| 6,485,281 B1 | 11/2002 | Curl |
| 6,656,541 B1 * | 12/2003 | Archer .............. B32B 17/10963 118/57 |
| 2005/0238743 A1 | 10/2005 | Wanstrath |
| 2010/0012857 A1 * | 1/2010 | Wanstrath ......... B32B 17/10963 118/643 |

FOREIGN PATENT DOCUMENTS

| | | |
|---|---|---|
| CN | 105818317 A | 8/2016 |
| CN | 111703094 A | 9/2020 |
| DE | 10336578 A1 | 2/2005 |
| EP | 1645381 A1 | 4/2006 |
| EP | 3140107 B1 | 8/2018 |
| WO | WO 97/39879 A1 | 10/1997 |
| WO | WO 2019/100141 A1 | 5/2019 |

* cited by examiner

GLASS REPAIR DEVICE AND REPAIR METHOD

CROSS REFERENCE TO RELATED APPLICATION

This application claims benefit to German Patent Application No. DE 10 2021 116 166.5 filed on Jun. 22, 2021, which is hereby incorporated by reference herein.

FIELD

The present invention relates to a device for repairing a damaged spot of a glass pane, and to a repair method.

BACKGROUND

Damaged spots of a glass pane, in particular a laminated glass pane of a motor vehicle, may be the result of, for example, stone impact. In the prior art, it is known to fill the damaged spot with a repair agent, for example with a curable repair resin. Various devices are known for this purpose.

International Publication WO 97/39879 A1 discloses a repair device having an injector unit for filling a damaged spot of a laminated glass with a repair liquid.

SUMMARY

In an embodiment, the present invention provides a device for repairing a damaged spot in a repair area of a glass pane. The device includes an attachment portion, a repair portion and a first sensor device. The attachment portion is configured to be releasably attached to a main surface of the glass pane. The repair portion is configured to repair the glass pane. The first sensor device is configured to be brought into data connection with a control device and to determine a contact pressure with which an injector unit, which is configured to be disposed on the repair portion, is pressed onto the repair area in order to release a repair agent.

BRIEF DESCRIPTION OF THE DRAWINGS

Subject matter of the present disclosure will be described in even greater detail below based on the exemplary figures. All features described and/or illustrated herein can be used alone or combined in different combinations. The features and advantages of various embodiments will become apparent by reading the following detailed description with reference to the attached drawings, which illustrate the following.

DETAILED DESCRIPTION

Embodiments of the present invention provide a device and method that facilitates or improves the repair of a damaged spot of a glass pane.

The device according to an embodiment of the invention includes an attachment portion for releasable attachment of the device to a main surface of the glass pane, a repair portion for repairing the glass pane, as well as a first sensor device for determining a contact pressure with which an injector unit, which can be disposed on the repair portion, is pressed onto a repair area in order to release a repair agent.

The glass pane may be a single glass pane or a laminated glass pane. The glass pane includes two main surfaces as well as edge surfaces connecting the main surfaces. If the glass pane is, for example, a windshield of a motor vehicle, then one main surface faces the interior of the vehicle and the other main surface faces the exterior of the vehicle when the windshield is in an installed position. The repair area includes the damaged spot of the glass pane and the area of the respective main surface of the glass pane that surrounds the damage area.

The attachment portion may include one or more attachment means, which may be in the form of, for example, an elastic sealing surface, a suction cup, or a magnetic element.

The repair portion is placed over the repair area of the glass pane and includes and/or carries means for repairing the damaged spot, which will be discussed further below.

The first sensor device serves to determine a contact pressure with which an injector unit, which can be disposed on the repair portion, is pressed onto the repair area. A force, a pressure, or an expansion, for example, may be measured as a measure of the contact pressure. The first sensor may include a force transducer of any type, which may be disposed, for example, on the repair portion, in particular on a holding device, for example, for the injector unit, or on the injector unit itself. The first sensor may also include a strain-sensing element of any type, such as an adhesively attached strain gauge which is disposed on a deformation region provided in particular on the repair portion or between the attachment portion and the repair portion. A suitable deformation region may be any region of the structure of the device that, in response to the injector unit being pressed with a contact pressure onto the glass pane, experiences an elongation or compression that can be measured by the first sensor device.

Given suitable calibration of the first sensor device and possibly of the device, the contact pressure can be determined as an absolute value. In many cases, a relative measurement is sufficient for practical purposes. To this end, a first value of the contact pressure may be determined as a reference or zero value when the injector unit only just touches the repair area during the adjustment process. Further values of the contact pressure are then measured relative to this reference or zero value.

The first sensor device can be brought into data connection with a control device, so that the measured contact pressure values can be processed and used, for example, to control the repair method that can be performed by the device.

Preferably, the device includes the control device, the first sensor device preferably being in data connection with the control device. The data connection serves to transmit the measurement values acquired by the first sensor device to the control device and may be wireless or wired. In either case, the measurement value may be transmitted in analog or digital form.

The device according to an embodiment of the invention includes the injector unit, which may be disposed on the repair portion. At a first end facing the damaged spot, the injector unit is provided with a release opening for the repair agent and preferably with a seal, for example in the form of an O-ring, which is disposed around the release opening. When the injector unit is disposed with the seal on the repair area, then the seal, the first end of the injector unit, and the portion of the repair area that is located within the seal and includes the damaged spot together bound a repair space. The injector unit may be connected in fluid communication to a reservoir containing the repair agent or may itself include a receiving chamber capable of holding an amount of repair agent sufficient to repair at least one damaged spot. The receiving chamber may be configured as a cylindrical bore in which is disposed a movable plunger or piston by means of which the repair agent can be delivered through the release opening.

The injector unit may include a vacuum means for applying negative pressure to the repair space. This may be a connection for a vacuum pump. However, the vacuum means may also be constituted by the plunger or piston. Prior to or subsequent to filling the damaged spot with the repair agent, negative pressure may be applied to the repair space, thereby improving the penetration of the repair agent into the damaged spot and/or the removal of air bubbles from the repair agent.

The repair agent may preferably be a liquid, particularly preferably a resin.

A signaling device may output a signal or a message when the contact pressure measured by the first sensor device exceeds and/or falls below a definable setpoint value and/or lies within and/or outside a definable setpoint range. This may occur at any points in time during the use of the device, for example, during the adjustment of the injector unit on the damaged spot, during the application of pressure and/or vacuum to the repair space and/or during the dispensing of the repair agent onto the damaged spot. In this way, a user may obtain feedback as to whether the injector unit is pressed with insufficient force, with adequate force, or with excessive force against the damaged spot of the glass pane. Insufficient contact pressure may result in a repair agent emerging from the repair space as it is released onto the damaged spot. Another consequence of insufficient contact pressure may be that the repair space, and thus the damaged spot, cannot be subjected to a positive or negative pressure. On the other hand, excessive contact pressure may lead to separation of the attachment means from the glass pane and to resin leakage or, in the worst case, to further damage to the glass pane.

The device according to an embodiment of the invention includes a damaged-spot-locating device. This may be, for example, a lens system, an optical sensor, a camera, a laser, or a mechanical probe, such as a stylus. The damaged-spot-locating device is used to locate the damaged spot of the glass pane and to find an optimal repair position and orientation for the device on the glass pane.

The repair portion of the device may include a first holding device for holding the injector unit, the first holding device preferably being disposed on the repair portion in such a way that its orientation relative to the main surface of the glass pane can be adjusted and preferably locked in position, for example by means of a ball-and-socket joint. Also preferably, the repair portion also includes a second holding device for holding the damaged-spot-locating device, which second holding device may be constituted by the first holding device. The holding devices may include means for fixing the injector unit and/or the damaged-spot-locating device in place, such as a snap fastener or preferably a screw thread.

In an embodiment, the repair portion of the inventive device is rotatable relative to the attachment portion about an axis of rotation substantially normal to the main surface of the glass pane and is preferably capable of being locked in its rotational position. Thus, once the attachment portion is fixed in place on the pane, the repair portion can be moved on a circular path about the attachment portion in order to locate and repair the damaged spot.

In another embodiment, a radial distance between the first holding device and the axis of rotation can be adjusted and preferably locked in position. In conjunction with the aforedescribed rotatability of the repair portion about the attachment portion, the damaged-spot-locating device and/or the injector unit can be adjusted within a circular disk-shaped area of the pane surface about the axis of rotation. This makes it possible to initially position the device with its attachment portion on the glass pane only coarsely with respect to the damaged spot, and to subsequently perform the fine adjustment through selection of the rotational position and adjustment of the radial distance in order to locate and then repair the damaged spot.

The device according to an embodiment of the invention includes an excitation device for producing a periodic mechanical excitation and coupling it into the glass pane, the control device being configured for controlling the excitation.

The excitation device may include means for producing the periodic mechanical excitation and coupling it into the glass pane. The excitation may be produced, for example, by an unbalanced motor. If the device is of a single-piece design, then in the simplest case, the attachment portion positioned on the pane may act as an input coupling element. Additionally or alternatively, the coupling-in may be effected via a separate input coupling element. The excitation may also be produced by a waveform generator. In this case, an actuator, for example in the form of a piezoelectric element or a structure-borne sound converter placed on the pane or a loudspeaker disposed near the pane, may be provided as the input coupling element. The excitation may be continuous or pulsed.

The term "periodic" as used in this application should be understood in the broadest sense. For example, the excitation may have a periodicity in a strictly mathematical sense, but this does not have to be the case. Rather, it should be understood to be within the meaning of "periodic" if the excitation includes at least one oscillating component, without there being any periodicity in a mathematical sense.

The excitation device may be integrated into the device or permanently connected thereto, but it may also be entirely or partially designed as a separate excitation module and connected to the remainder of the device only in terms of control or optionally also in terms of power supply. An integrated design offers the advantage of easier handling. In contrast, a separate design offers the advantage that the excitation module can be positioned on the pane independently of the remainder of the device, which can be advantageous in terms of in-coupling efficiency.

The excitation contributes to the repair process and to the repair result by the vibration excited in the glass pane improving the filling of the damaged spot with the repair agent and by reducing or eliminating any gas bubbles that may be present in the repair agent. This improves the visual quality of the repaired damaged spot.

The control device may be configured to control at least one excitation parameter, such as a frequency, a frequency spectrum, an amplitude, an intensity, a start time, or a duration of the excitation. It is understood that this also includes the control of several or all of the excitation parameters mentioned. For example, the control device may control the frequency, the start time, and the duration of the excitation.

The control device may, in particular, be configured to vary the at least one excitation parameter of the in-coupled excitation within a definable excitation parameter range. For example, during excitation, the control device may vary the excitation frequency within a definable frequency range and/or the excitation intensity within a definable intensity range.

The frequency range depends in particular on the properties of the glass pane and determines the selection of a suitable excitation device. By way of example, the frequency range may include frequencies from 20 Hz to 1500 Hz. Vibrations in this frequency range can be easily produced using an unbalanced motor. However, the invention is not limited to this frequency range or this excitation source, but may in general also include other frequencies, for example in the kHz range or in the lower MHz range.

The control of the at least one excitation parameter may preferably be performed automatically and/or in a program-controlled manner. This allows the device to perform repair programs which may be previously created (e.g., based on empirical data) and optimized for specific applications. The repair programs may, for example, be tailored to properties of the injector unit used (features of the first end, such as size of the release opening and/or size and nature of the seal) and/or to properties of the repair agent used (viscosity, curing time, etc.). The repair programs may also be tailored to properties of glass panes (thickness, structure, size, location of the damaged spot, etc.).

In a preferred embodiment, the device may include a second sensor device for determining at least one response parameter of a vibration produced by the excitation in the glass pane, in particular in the repair area. The at least one response parameter may be a frequency, a frequency spectrum, an amplitude, an intensity, or a phase shift of the vibration excited in the glass pane, which phase shift is relative to a phase of the excitation.

The second sensor device may be in data connection with the control device. The data connection serves to transmit the measurement values acquired by the second sensor device to the control device and may be wireless or wired. In either case, the measurement value may be transmitted in analog or digital form. The second sensor device may be integrated into the device or permanently connected thereto, but it may also be designed as a separate sensor module and connected to the device only via the data connection. When designed as a separate sensor module, the sensor device can be flexibly positioned on the glass pane.

In conjunction with the above-described variation of at least one excitation parameter, the second sensor device can thus be used to determine, as a function of one or more excitation parameter(s), whether and to what extent a vibration is coupled into the glass pane. This allows the operator to select one or more excitation parameter(s) and/or excitation parameter range(s) in such a way as to create the most favorable conditions possible for a successful repair. For example, the excitation frequency may be selected to be substantially equal to a resonant frequency of the glass pane.

The control device may also be configured to automatically control the excitation as a function of the at least one response parameter determined by the second sensor device, and in particular in such a way that the response parameter reaches or falls below or exceeds a reference value that can be specified in the control device. For example, a resonant frequency of the pane can be found by the second sensor device determining, as a response parameter, the phase shift of the vibration excited in the glass pane, which phase shift is relative to a phase of the excitation. For this purpose, the excitation frequency is varied until the phase shift reaches a reference value of $-\pi/2$, which indicates the presence of resonance (the phase of the vibration of the glass pane lags the phase of the excitation by $\pi/2$). Alternatively or in addition, the amplitude of the vibration of the glass, for example, may be determined as a response parameter. In this case, the control device may, for example, control the excitation frequency and/or the excitation intensity in such a way that a reference value for the amplitude of the vibration excited in the glass pane is reached or exceeded (to achieve a good repair result) and/or such that the reference value is not exceeded (for example, to avoid further damage to the glass pane).

The excitation may also be controlled in such a way that the at least one response parameter assumes a maximum or minimum value relative to the excitation parameter range. To this end, for example, the excitation frequency (as the excitation parameter) is initially varied within a selectable frequency range (as the excitation parameter range), while at the same time, the second sensor device determines the amplitude or the intensity (as a response parameter) of the vibration of the glass pane and transmits this data to the control device. Value pairs of excitation frequency and associated amplitude or intensity of the vibration of the glass pane may at least temporarily be stored (e.g., as a table) in the control device. During the dispensing of the repair agent onto the damaged spot and/or during the curing of the repair agent, the excitation may then be effected at the frequency at which the amplitude of the vibration of the glass pane assumes a maximum value relative to the previously examined frequency range. With this, the excitation can be performed in such a way that the vibration thereby produced in the glass pane is as intense as possible. This is particularly the case when the excitation is performed with a resonant frequency of the glass pane. Intense vibration allows the repair agent to penetrate as efficiently as possible into the damaged spot and/or to remove bubbles from the repair agent to the greatest extent possible, which altogether results in a best possible repair result.

The values that can be set by the control device or by components of the device which are connected to the control device or by external devices, such as the "reference value," the "minimum value," and the "maximum value," include a range of variation of +/−20%.

In another embodiment, the excitation device includes an input coupling element for coupling the periodic mechanical excitation into the glass pane. If the excitation is produced by an unbalanced motor, then the input coupling element may be a component that is mechanically coupled to both the motor and the glass pane, for example, by bearing against the glass pane and transmitting the vibration produced by the motor to the pane. The input coupling element may be constituted by the damaged-spot-locating device (in the form of a mechanical probe) and/or in particular by the injector unit, which makes it possible to dispense with additional components. In this case, the contact pressure described above with reference to the first sensor device is of particular importance because the contact pressure can influence the efficiency of the in-coupling of the mechanical vibration.

In a further embodiment, the device according to the invention includes a communication unit having means for inputting and/or outputting data and/or information. Examples of means for inputting and outputting data include a membrane keyboard, a touch screen, a touch pad, a USB port, the signaling device mentioned earlier herein, and a wireless or wired data connection to an external device, on which a portion of the communication unit or some of its functions may be provided. The signaling device serves to output visual and/or audible signals or messages. The communication unit may be connected to the control device via a data connection.

The device according to an embodiment of the invention includes a radiation source for curing the repair agent, the radiation source preferably being disposed on the repair portion, in particular on the first holding device. The radiation source may include one or more light-emitting elements and preferably emits light of a wavelength or within a wavelength range that causes or accelerates curing of the repair agent. Preferably, light in the UV range is used. In addition, a further radiation source may be provided for illuminating the repair area.

The device according to an embodiment of the invention includes an internal power source, such as a primary or secondary battery, and/or an external power supply, for example via a USB port.

The device according to an embodiment of the invention includes means for measuring the ambient temperature and/or for measuring the ambient relative humidity.

An embodiment of the invention also provides a method for repairing a damaged spot of a glass pane using a repair device, in particular the aforedescribed device according to any of the embodiments of the invention.

In the following description, the aspects of embodiments of the method according to the invention are also referred to as "steps," which are identified alphabetically for easier reference. However, it is expressly noted that this does not imply any order of the steps. Rather, each of the individual method steps described hereinafter may be performed before and/or during and/or simultaneously with and/or after another step of the method, provided this is technically possible and useful. Thus, the method steps may be performed in any order and both successively and entirely or partially in parallel, provided this is technically possible and useful.

The inventive method for repairing a damaged spot of a glass pane, according to an embodiment, includes at least the steps of:
 (a) providing a repair device, in particular a device according to an embodiment of the invention,
 (b) positioning the repair device on the glass pane,
 (c) dispensing a repair agent onto the damaged spot, as well as
 (d) curing the repair agent, in particular under irradiation by a radiation source,
 (e) determining a contact pressure with which an injector unit is pressed against the glass pane in order to release a repair agent, before and/or at least partially during and/or after step (c).

In another embodiment, the method further includes the steps of:
 (f) comparing the contact pressure to a setpoint value or a setpoint range, and optionally,
 (g) outputting a signal and/or interrupting or aborting the method when the contact pressure falls below or exceeds the setpoint value or when the contact pressure lies within and/or outside the setpoint range.

Each of the individual steps (e) through (g) may, for example, be performed at least temporarily during or after step (b) and/or before or at least temporarily during method steps (c) and/or (d). Preferably, the determination of the contact pressure according to step (e) is performed at least already during the alignment and adjustment of the injector unit on the repair area of the glass pane, which have been described above with reference to the device. The contact pressure may be determined as an absolute value or relative to a reference or zero value, for example as described above with reference to the device.

By means of steps (e) through (g), the injector unit can be placed with a convenient contact pressure on the repair area of the glass pane, thereby making it possible to achieve the advantages described above with reference to the first sensor device of the device according to an embodiment of the invention.

In accordance with another embodiment, provision is additionally made for
 (h) coupling a periodic mechanical excitation into the glass pane,
 (i) controlling the excitation in such a way that at least one excitation parameter of the excitation is varied within an excitation parameter range. The at least one excitation parameter may be one of the excitation parameters listed above with reference to the control device.

The coupling-in of the excitation according to step (h) may be performed in particular before and/or at least temporarily during method steps (c) and/or (d). Likewise, the control of the excitation according to step (i) may be performed in particular before and/or at least temporarily during method steps (c) and/or (d). In addition, the damaged spot may be subjected to negative pressure, in particular before and/or during step (c) and/or before and/or during step (d).

The periodic mechanical excitation may be coupled into the glass pane according to step (h), for example, while the repair agent is dispensed onto the damaged spot according to step (c). During this process, the excitation frequency (as the excitation parameter), for example, may be varied according to step (i) within an excitation frequency range (as the excitation parameter range). The coupling-in of the excitation according to step (h) may also continue to be performed at least partially during the curing of the repair agent according to step (d), while the variation of the excitation frequency according to step (i) may be continued or dispensed with.

In another embodiment, the method further includes the steps of:
 (j) determining at least one response parameter of a vibration produced by the excitation in the glass pane, in particular in the repair area, and
 (k) controlling the excitation in particular in such a way that during step (c) and/or step (d), the excitation is at least temporarily, preferably predominantly, performed substantially with an operational value of the at least one excitation parameter at which the at least one response parameter reaches or exceeds or falls below a reference value or assumes a maximum or minimum value relative to the excitation parameter range.

The at least one response parameter in step (j) may be one of the response parameters mentioned above with reference to the second sensor device, and may in particular be an amplitude or an intensity.

The determination of the response parameter according to step (j) may in particular be performed during the coupling-in of the excitation according to step (h), and thus before and/or at least temporarily during method steps (c) and/or (d), and makes it possible to check whether and to what extent a vibration is coupled into the glass pane. If the determination of the response parameter according to step (j) is performed during the variation of the excitation parameter according to step (i), then the excitation according to step (k) may be controlled in such a way as to create the most favorable conditions possible for a successful repair. In order to avoid repetitions, reference is made to the above description of embodiments of the device according to the invention.

The method according to an embodiment of the invention may further include the step of:
(l) setting at least one operating parameter of the repair device, the at least one operating parameter being selected from a group including:
setpoint value or setpoint range of the contact pressure of the injector unit,
point or points in time for switching the excitation device on and/or off,
limits of the excitation parameter range of the at least one excitation parameter,
temporal behavior of the variation of the at least one excitation parameter,
reference value of the at least one response parameter,
point or points in time for switching the radiation source on and/or off,
the setting preferably being performed by means of a control device and/or by means of a communication unit and/or by means of an external device in data connection with the device.

Depending on the operating parameter, method step (1) may be performed before, during, or after any of the aforementioned method steps (b) through (k), provided this is technically possible and useful. This makes it possible to make extensive use of the technical features of the device.

Starting from the aforementioned method step (1), the method according to the invention may also include one or both of the following method steps:
(m) retrieving a repair program which is stored in the device, in particular in the control device and/or the communication unit, and/or in the external device in data connection with the device and which includes the at least one operating parameter, the retrieval being performed in particular as a function of the repair agent intended for the repair and/or of the glass pane to be repaired, and/or
(n) performing control in such a way that at least steps (e), (f) and (g) are executed in an automated manner.

Furthermore, the control according to step (n) may preferably also include the automated execution of steps (h), (i) and (j), more preferably of steps (h) through (k). Particularly preferred in step (n) is the automated execution of steps (e) through (g) and of steps (h) through (k).

Suitable repair programs may be previously created based on empirical data and optimized for specific applications. The repair programs may, for example, be tailored to properties of the injector unit used (features of the first end, such as size of the release opening and/or size and nature of the seal) and/or to properties of the repair agent used (viscosity, curing time, etc.). The repair programs may also be tailored to properties of glass panes (thickness, structure, size, location of the damaged spot, etc.). Through substantial automation, the ease of use can be improved, and a complex repair method can be easily and successfully performed even by less experienced operators.

Further features and advantages of embodiments of the invention will be apparent from the following description and graphical representation of preferred, but non-limiting exemplary embodiments.

Figure 5:
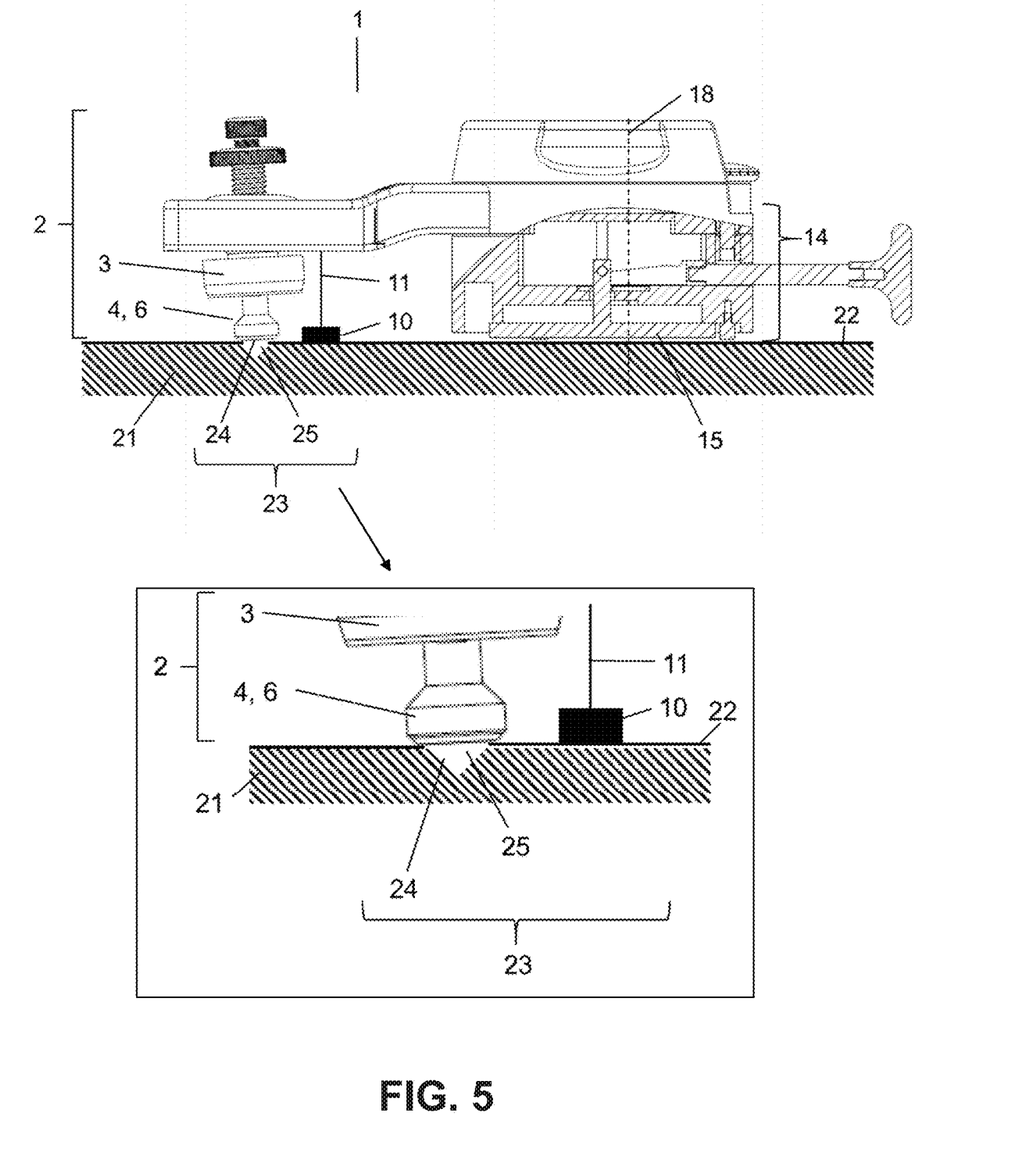
FIG. 5 is a view showing a device according to another embodiment of the invention.

A device 1 according to an embodiment of the invention, as illustrated in FIGS. 1 through 4, includes a repair portion 2 having a first holding device 3 for holding an injector unit 4 (see FIG. 5). To enable the device to be releasably attached to a main surface 22 of a glass pane 21 (see FIG. 5), there is provided an attachment portion 14 having an attachment means 15 in the form of a suction cup.

A first sensor device 12 in the form of a strain gauge is disposed in a deformation region 13 between repair portion 2 and attachment portion 14. This makes it possible to detect deformation (e.g., compression or expansion) of deformation region 13, such as occurs, for example, when an injector unit 4 inserted in first holding device 3 is pressed with a contact pressure against glass pane 21. Higher contact pressures result in greater deformations of deformation region 13, so that the contact pressure can be determined in this way.

Figure 1:
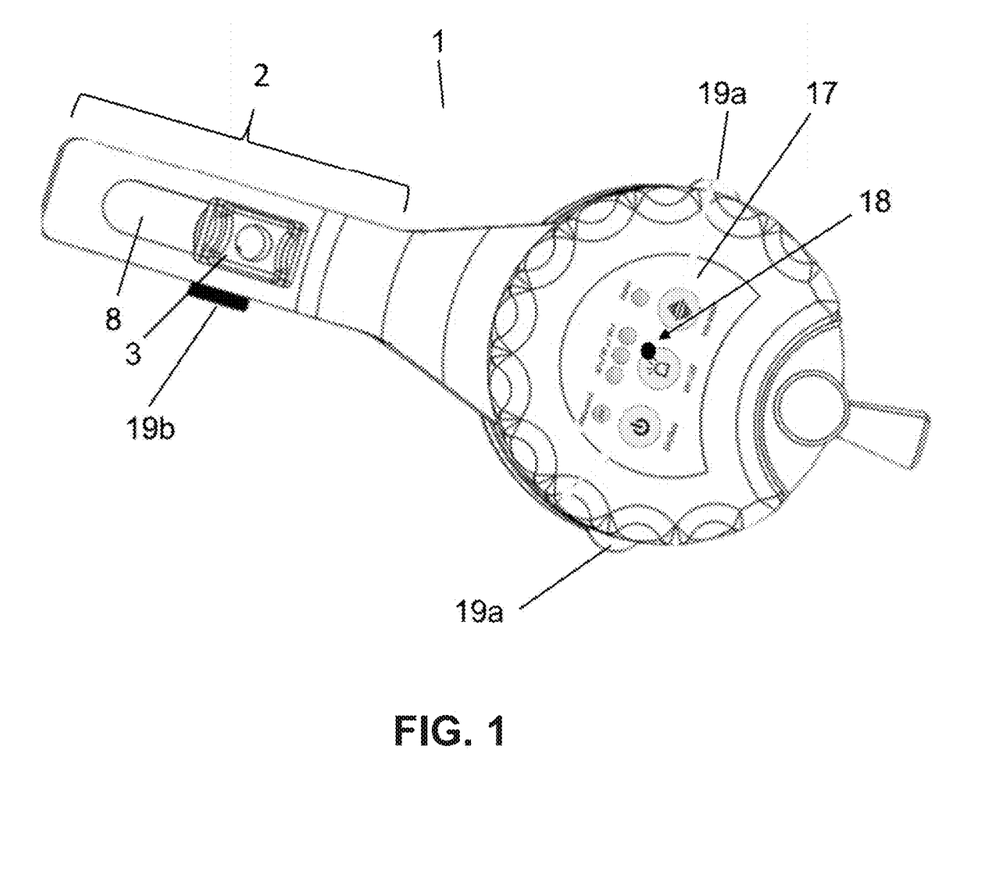
FIG. 1 is a plan view of a device according to an embodiment of the invention.
Figure 2:
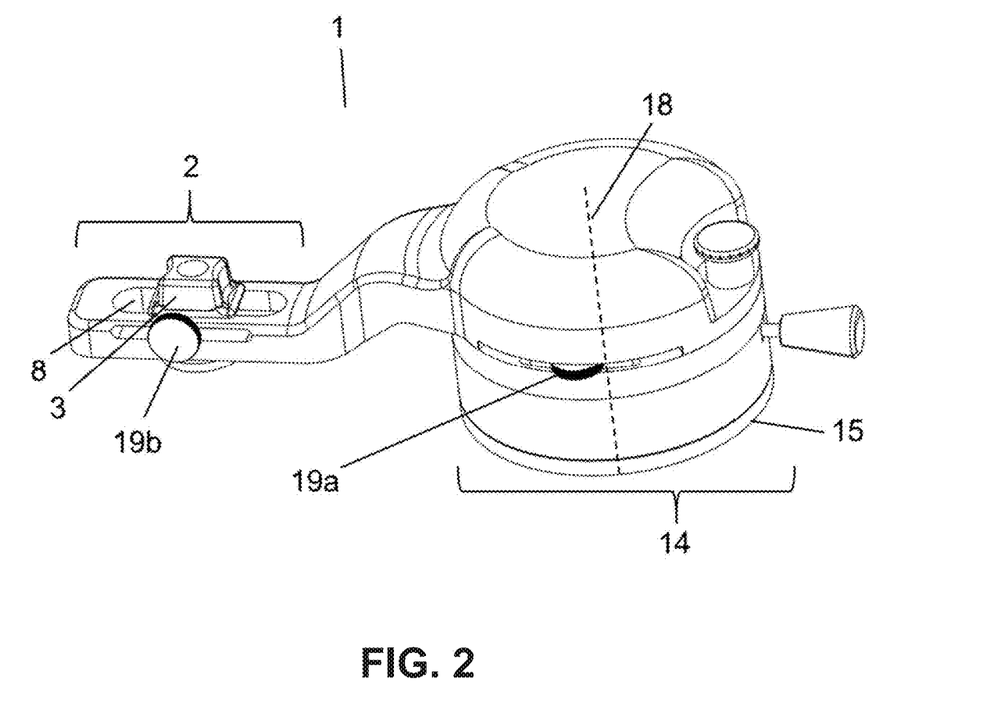
FIG. 2 is a side view of the device of FIG. 1.

Once device 1 is attached to glass pane 21, repair portion 2 is rotatable about an axis of rotation 18 substantially perpendicular to main surface 22 of glass pane 21, indicated by a dot in the plan view of FIG. 1 and by a dashed axis in the perspective view of FIG. 2. Repair portion 2 is capable of being locked in its rotational position by first locking means 19a in the form of knurled-head screws (see FIGS. 2 and 3). First holding device 3 is received in a slotted hole 8 such that it is radially displaceable relative to axis of rotation 18 and lockable by a second locking means 19b. Thus, first holding device 3 can be adjusted within a circular disk-shaped area of main surface 22 of glass pane 21 extending concentrically around axis of rotation 18.

In order to locate damaged spot 24 (see FIG. 5), a damaged-spot-locating device, in the simplest case a mechanical probe, e.g., in the form of a stylus, may be fixed in first holding device 3 and used to locate the damaged spot while rotating repair portion 2 about axis of rotation 18 and/or while radially displacing first holding device 3. Once device 1 is locked in a suitable position and orientation, the damaged-spot-locating device can be removed and an injector unit 4 (see FIG. 5) can be inserted into first holding device 3.

Device 1 includes a control device 16 (see FIG. 4) and a communication unit 17 (see FIG. 1) which is connected to control device 16 and used as a user interface and which provides the necessary controls, indicators, and signaling devices. A secondary battery 20 is provided for power supply (see FIG. 4). Control device 16 is in data connection with first sensor device 12.

Figure 3:
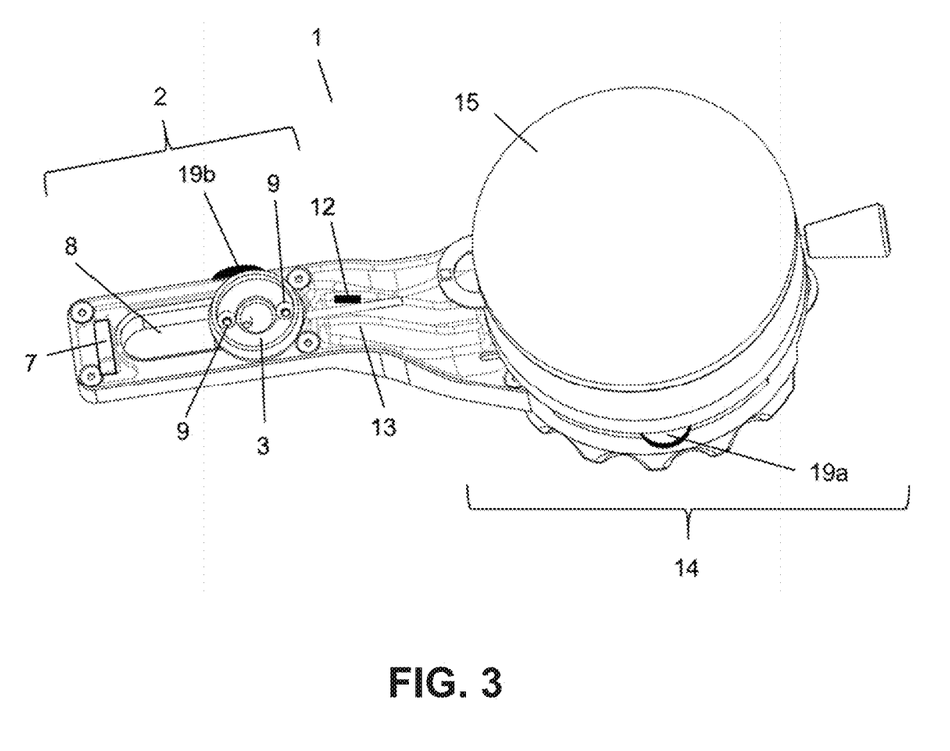
FIG. 3 a bottom of the device of FIG. 1.
Figure 4:
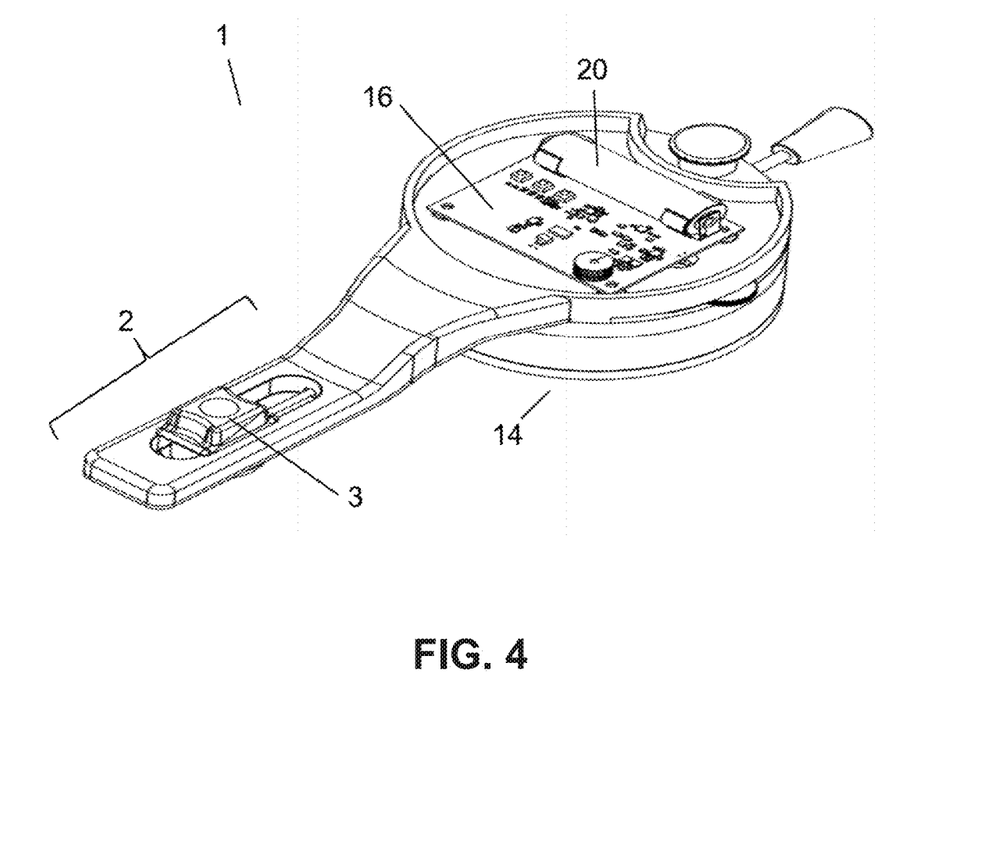
FIG. 4 is a partial view of the device of FIG. 1.

An unbalanced motor 7 is provided on repair portion 2 as part of an excitation device 5 and serves to produce a periodic mechanical excitation (see FIG. 3). The coupling-in of the excitation is effected partly via attachment portion 14 and attachment means 15, but mainly via injector unit 4 which, during the repair process, is inserted in first holding device 3 and rests directly on repair area 23 of pane 21 (see FIG. 5) and which functions as an effective input coupling element 6.

Device 1 includes a radiation source 9 in the form of two UV LEDs for curing the repair agent.

FIG. 5 shows another device 1 according to an embodiment of the invention in a partially cross-sectional side view. The device 1 shown in FIG. 5 is substantially similar to the device 1 described above with reference to FIGS. 1 through 4. Like or functionally equivalent elements carry the same reference numerals. The following will mainly discuss the features of FIG. 5 that differ from FIGS. 1 through 4.

The device 1 according to FIG. 5 is attached by its attachment portion 14 to a main surface 22 of a glass pane 21 and adjusted and aligned in such a way that the injector unit 4 inserted in first holding device 3 is positioned over the repair area 23 containing damaged spot 24. A first end of injector unit 4 rests (via a seal) with a contact pressure on repair area 23.

When unbalanced motor 7 (see FIG. 3) is activated, injector unit 4 functions as an effective input coupling element 6 for coupling the excitation into glass pane 21. In FIG. 5, it can be seen that first holding device 3 is movably disposed on repair portion 2, which makes it possible to adjust an orientation of injector unit 4 relative to main surface 22 of glass pane 21. This is advantageous so as to efficiently seal repair space 25, especially in the case of sharply curved glass panes. The boxed-in portion of FIG. 5 provides an enlarged view of repair area 23, injector unit 4, and second sensor device 10.

Device 1 includes a second sensor device 10 in the form of a vibration sensor (e.g., a piezoelectric sensor) which is disposed on glass pane 21 in repair area 23 and connected to control device 16 via a data connection 11. Second sensor device 10 serves to determine the vibration of the glass pane caused by the excitation coupled thereinto.

Device 1 according to embodiments of the invention is particularly suited for performing the method according to embodiments of the invention. In principle, however, the method according to the invention may also be performed using devices which differ in some design details.

While subject matter of the present disclosure has been illustrated and described in detail in the drawings and foregoing description, such illustration and description are to be considered illustrative or exemplary and not restrictive. Any statement made herein characterizing the invention is also to be considered illustrative or exemplary and not restrictive as the invention is defined by the claims. It will be understood that changes and modifications may be made, by those of ordinary skill in the art, within the scope of the following claims, which may include any combination of features from different embodiments described above.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

LIST OF REFERENCE NUMERALS 1 device
2 repair portion
3 first holding device
4 injector unit
5 excitation device
6 input coupling element
7 unbalanced motor as a means for producing an excitation (part of excitation device 5)
8 slotted hole
9 radiation source
10 second sensor device
11 data connection between second sensor device 10 and control device 16
12 first sensor device
13 deformation region
14 attachment portion
15 attachment means (suction cup)
16 control device
17 communication unit
18 axis of rotation
19a locking means (rotational position about axis of rotation 18)
19b locking means (radial distance from axis of rotation 18)
20 power source
21 glass pane
22 main surface of the glass pane
23 repair area
24 damaged spot
25 repair space

What is claimed is:

1. A device for repairing a damaged spot in a repair area of a glass pane, the device comprising:
an attachment portion configured to be releasably attached to a main surface of the glass pane;
a repair portion configured to repair the glass pane; and
a first sensor configured to be brought into data connection with a control device and to determine a contact pressure with which an injector unit, which is configured to be disposed on the repair portion, is pressed onto the repair area in order to release a repair agent.

2. The device as recited in claim 1, further comprising the control device, wherein the first sensor is in the data connection with the control device.

3. The device as recited in claim 1, further comprising the injector unit, wherein the injector unit is disposed on the repair portion.

4. The device as recited in claim 3, wherein the repair portion includes a first holding device configured to hold the injector unit.

5. The device as recited in claim 1, wherein the repair portion is rotatable relative to the attachment portion about an axis of rotation substantially normal to the main surface of the glass pane.

6. The device as recited in claim 5, wherein a radial distance between a first holding device configured to hold the injector unit and the axis of rotation is adjustable.

7. The device as recited in claim 1, further comprising an excitation device configured to produce a periodic mechanical excitation and couple the periodic mechanical excitation into the glass pane, wherein the control device is configured to control the periodic mechanical excitation.

8. The device as recited in claim 7, wherein the control device is configured to control the periodic mechanical excitation with respect to at least one excitation parameter, the at least one excitation parameter including a frequency, a frequency spectrum, an amplitude, an intensity, a start time, and/or a duration of the periodic mechanical excitation.

9. The device as recited in claim 8, wherein the control device is configured to vary, automatically and/or in a program-controlled manner, the at least one excitation parameter within an excitation parameter range.

10. The device as recited in claim 7, further comprising a second sensor which is in data connection with the control device and is configured to determine at least one response parameter of a vibration produced by the periodic mechanical excitation in the repair area of the glass pane, the at least one response parameter including a frequency, a frequency spectrum, an amplitude, an intensity, and a phase shift relative to a phase of the periodic mechanical excitation.

11. The device as recited in claim 10, wherein the control device is configured to control the periodic mechanical excitation as a function of the at least one response parameter in such a way that the at least one response parameter reaches, falls below or exceeds a reference value that can be specified in the control device.

12. The device as recited in claim 10, wherein the control device is configured to control the periodic mechanical excitation as a function of the at least one response parameter in such a way that the at least one response parameter assumes a maximum or minimum value relative to the excitation parameter range.

13. The device as recited in claim 7, wherein an input coupling element is configured to couple the periodic mechanical excitation into the glass pane.

14. The device as recited in claim 1, further comprising a user interface.

15. The device as recited in claim 1, further comprising a radiation source configured to cure the repair agent, the radiation source being disposed on the repair portion.

16. The device as recited in claim 1, wherein the first sensor comprises a force transducer disposed on the repair portion or a strain-sensing element disposed on a deformation region of the device.

17. The device as recited in claim 16, wherein the first sensor comprises the force transducer, which is disposed on the injector unit or on a holding device for the injector unit.

18. The device as recited in claim 16, wherein the first sensor comprises the strain-sensing element disposed on the deformation region of the device.

19. The device as recited in claim 18, wherein the deformation region is on the repair portion or between the attachment portion and the repair portion.

20. The device as recited in claim 18, wherein the strain-sensing element is a strain gauge that is adhesively attached to the deformation region of the device.

21. The device as recited in claim 1, wherein the glass pane is a windshield of a motor vehicle, and wherein the main surface of the glass pane faces an exterior of the motor vehicle in an installed position of the windshield.

22. A method for repairing a damaged spot in a repair area of a glass pane, the method comprising:
    (a) providing the device of claim 1 as a repair device;
    (b) positioning the repair device on the glass pane;
    (c) dispensing a repair agent onto the damaged spot;
    (d) curing the repair agent; and
    (e) determining a contact pressure with which an injector unit is pressed against the glass pane in order to release the repair agent, before and/or at least partially during and/or after the step (c).

23. The method as recited in claim 22, further comprising:
    (f) comparing the contact pressure to a setpoint value or a setpoint range; and
    (g) outputting a signal and/or interrupting or aborting the method when the contact pressure falls below or exceeds the setpoint value or when the contact pressure lies within and/or outside the setpoint range.

24. The method as recited in claim 23, further comprising:
    (g) outputting a signal and/or interrupting or aborting the method when the contact pressure falls below or exceeds the setpoint value or when the contact pressure lies within and/or outside the setpoint range.

25. The method as recited in claim 22, further comprising:
    (h) coupling a periodic mechanical excitation into the glass pane before and/or at least temporarily during the step (c) and/or the step (d); and
    (i) controlling the periodic mechanical excitation in such a way that at least one excitation parameter of the periodic mechanical excitation is varied within an excitation parameter range before and/or at least temporarily during the step (c) and/or the step (d).

26. The method as recited in claim 25, further comprising:
    (j) determining at least one response parameter including an amplitude and/or an intensity of a vibration produced by the periodic mechanical excitation in the repair area of the glass pane; and
    (k) controlling the periodic mechanical excitation in such a way that during the step (c) and/or the step (d), the periodic mechanical excitation is at least temporarily performed with an operational value of the at least one excitation parameter at which the at least one response parameter reaches, exceeds or falls below a reference value or assumes a maximum or minimum value relative to the excitation parameter range.

27. The method as recited in claim 22, further comprising:
    (l) setting, by a control device, a communication unit and/or an external device in data connection with the repair device, at least one operating parameter of the repair device, the at least one operating parameter including:
        a setpoint value or setpoint range of the contact pressure
        a point or points in time for switching the excitation device on and/or off,
        limits of the excitation parameter range
        a temporal behavior of the variation of the at least one excitation parameter,
        a reference value of the at least one response parameter, and/or
        a point or points in time for switching a radiation source on and/or off.

28. The method as recited in claim 27, further comprising:
    (m) retrieving a repair program which is stored in the control device, the communication unit and/or in the external device, and which includes the at least one operating parameter, the retrieval being performed as a function of the repair agent intended for the repair and/or of the glass pane to be repaired; and/or
    (n) performing control in such a way that at least the steps (e), (f) and (g) are executed in an automated manner.

* * * * *